United States Patent [19]

Miyazaki et al.

[11] 4,311,682

[45] Jan. 19, 1982

[54] PROCESS FOR PREPARING A GRAPHITE PRODUCT

[75] Inventors: Takane Miyazaki, Tokyo; Takeshi Ikeda, Yokohama, both of Japan

[73] Assignee: Mitsubishi Chemical Industries, Ltd., Tokyo, Japan

[21] Appl. No.: 183,274

[22] Filed: Sep. 2, 1980

[30] Foreign Application Priority Data

Sep. 6, 1979 [JP] Japan .................................. 54-114651

[51] Int. Cl.$^3$ .............................................. C01B 31/04
[52] U.S. Cl. ..................................... 423/448; 423/445; 423/449; 264/29.1
[58] Field of Search ............... 423/445, 448, 449, 450; 264/29.1

[56] References Cited

U.S. PATENT DOCUMENTS

| Re. 29,101 | 1/1977 | Amagi et al. | 264/29.1 |
| 3,035,308 | 5/1962 | Ragoss et al. | 423/448 |
| 3,219,731 | 11/1965 | Etzel et al. | 264/29.1 |
| 4,100,265 | 7/1978 | Yoshimura et al. | 423/449 |

*Primary Examiner*—O. R. Vertiz
*Assistant Examiner*—Gregory A. Heller
*Attorney, Agent, or Firm*—Oblon, Fisher, Spivak, McClelland & Maier

[57] ABSTRACT

A process for preparing a carbon product, which comprises: (a) mixing hydrocarbon material derived from coal with a hydrocarbon solvent having a boiling point or a distillation temperature for 95 vol % of the solvent less than 350° C. and a B.M.C.I. value of 5 to 70, the value being defined as: B.M.C.I.=48,640/k+473.7S−456.8, wherein k is the average boiling point (°K) and S is the specific gravity at 60° F., (b) separating insoluble material which settles from the resulting mixture upon standing, (c) removing by distillation at least a portion of said solvent from the insoluble matter free mixture, (d) coking the residue obtained after distillation, thereby forming an acicular, green coke, (e) calcining the acicular green coke, thereby obtaining an acicular calcined coke having a pore volume of more than $40 + 10^{-3}$ cc/g, and (f) blending the acicular calcined coke with a binder, shaping the blend and graphitizing the blend at a high temperature.

7 Claims, No Drawings

PROCESS FOR PREPARING A GRAPHITE PRODUCT

BACKGROUND OF THE INVENTION

1. Field of the Invention

The present invention relates to a process for preparing a carbon product by using a coal type acicular coke. More particularly, it relates to a process for preparing a carbon product having excellent thermal shock resistance.

2. Description of the Prior Arts

Acicular cokes used for various carbon products have been produced by using petroleum type sources. Recently, various processes for producing acicular cokes by using coal type oils have been proposed.

The carbon products have been used as graphite electrodes, carbon brushes, carbon products of machines, electrode plates and substrates for chemical plants in various industrial fields. Recently, high quality of the carbon products has been required and various characteristics such as electrical, mechanical and thermal charactertstics of the carbon products have been improved to obtain high quality carbon products because of developments and rationalizations of technology.

For example, in a preparation of artificial graphite electrodes for steel productions, certain ultra-high power operation has been employed because of the rationalization by steel makers. As a result, it has been required to use a graphite electrode having excellent thermal shock resistance in high quality. That is, a graphite electrode having excellent characteristics such as great strength and low thermal expansion coefficient, low electric specific resistance and low modulus of elasticity has been required. Various conditions for the preparation of carbon products have been studied to provide satisfactory characteristics. It has been proposed to attain various improvements in steps of preparations of carbon products such as a condition for selecting particle sizes of cokes in blending and a selection of a kind and content of a binder, and a kneading operation, a molding operation, a baking operation, an immersing operation and a graphitizating operation. An improvement of a coke itself for the carbon product has been also studied.

Thus, it has been known that the carbon products prepared by using a coal type acicular coke, have characteristics such as low thermal expansion coefficient and excellent graphitizability, however there has not been found any technology for obtaining a carbon product having satisfactory characteristics for high thermal shock resistance especially high strength.

The inventors have studied, in detail, functions of characteristics of cokes for imparting characteristics of carbon products in order to prepare carbon products having excellent thermal shock resistance by using coal type acicular cokes. As a result, the inventors have found that qualities of carbon products especially thermal shock resistance closely relate to pore volume of the coal type acicular cokes.

SUMMARY OF THE INVENTION

It is an object of the present invention to provide a process for preparing a carbon product having excellent thermal shock resistance by using a coal type acicular coke.

The foregoing and other objects of the present invention have been attained by providing a process for preparing a carbon product which comprises: (a) mixing a hydrocarbon material derived from coal with a hydrocarbon solvent having a boiling point or a distillation temperature for 95 vol % of the solvent less than 350° C. and a B.M.C.I. value of 5 of 70, said value being defined as: $B.M.C.I. = 48,640/k + 473.7S - 456.8$, wherein k is the average boiling point (°K.) and S is the specific gravity at 60° F., (b) separating insoluble material which settles from the resulting mixture upon standing, (c) removing by distillation at least a portion of said solvent from the insoluble matter free mixture, (d) coking the residue obtained after distillation, thereby forming an acicular, green coke, (e) calcining the acicular green coke, thereby obtaining an acicular calcined coke having a pore volume of more than $40 \times 10^{-3}$ cc/g; and (f) blending the acicular calcined coke with a binder, shaping the blend and graphitizing the blend at a high temperature. The pore volume is preferably in a range of 60 to 200 m cc./g.

DETAILED DESCRIPTION OF THE PREFERRED EMBODIMENTS

The coal type acicular coke can be obtained by coking a coal type source such as coal tar and coal tar pitch if necessary, after a modification such as a separation o quinolin-insoluble matters (hereinafter referring to as Q.I.) from the coal type source and then calcining it.

The preparation of the coal type acicular coke will be illustrated in detail.

The sources are hydrocarbons containing Q.I. and condensed ring aromatic compounds. More particularly, the coal type sources can be coal tar and soft coal tar pitch.

The coal type source is admixed with hydrocarbons having a boiling point or a distillation temperature for 95 vol % of the solvent less than 350° C. and a B.M.C.I. value of 5 to 70, said value being defined as $$B.M.C.I. = 48,640/k. + 473.7S - 456.8$$

wherein k represents an average boiling point (°K.), and S represents a specific gravity at 60° F., which can be cyclohexane, kerosene and mixtures of kerosene and naphthalene oil at a ratio of 1:0.3 to 1:1 by weight.

The mixture of the coal type source and the solvent is kept in settling to precipitate the insoluble matters and the insoluble matters are separated by a simple operation such as a decantation to obtain hydrocarbons which do not substantially contain Q.I. A content of Q.I. in the hydrocarbons including condensed aromatic compounds obtained as a supernatant is decreased to less than 0.8% by weight preferably less than 0.3% by weight especially less than 0.1% by weight, based on the modified coal type source as described below.

The operations in the mixing step, the sedimentation step and the separation step are preferably carried out at a temperature of about 60° to 350° C. for the easy operations. For example, it is preferable to carry out at about 60° to 90° C. in the case of coal tar source and at about 150° to 290° C. in the case of soft coal tar pitch source.

The resulting supernatant is distilled at a distillation temperature of lower than a boiling point of the solvent or a distillation temperature for 95 vol. % or lower than about 350° C. The distillate is recovered and can be reused as the solvent if desired. For example, when coal tar is used as the source, it is preferable, for a coking, to form a pitch by heating to about 300° C. after the distillation of the solvent (such as a boiling point of 81° C. in the case of cyclohexane). After the distillation, the residue is discharged as the modified source.

The resulting modified source is used as a stock oil for coking. The acicular green coke is obtained by coking it by a delayed coking process. The main operations for the delayed coking process is as follows.

A recycle ratio as a ratio of a recycle oil fed from a fine distillation tower to a newly fed stock oil for coking is in a range of about 0 to 2. The mixture fed into the coking drum is heated at about 440° to 520° C. as the temperature at the outlet of the furnace. The coking drum is operated so as to maintain the temperature for about 24 to 48 hours. The top of the coking drum is kept at about 400° to 500° C. under a pressure of about 1.5 to 10 atm. An oil and a vapor are recycled from the coking drum to a fine distillation tower. Thus, the acicular green coke containing about 5 to 13% of volatile matters is obtained and is calcined at about 1000° to 1600° C. to obtain the acicular coke.

The resulting acicular coke is pulverized, seived and blended so as to produce the carbon product having high quality.

The most important operation of the present invention is to select the acicular coke which has the specific pore volume per 1 g. of the acicular coke measured by a mercury compressing process. A sample for the measurement is prepared by seiving it to be 10 to 20 mesh (Japanese Industrial Standard) and it is measured as follows. The pore volume per 1 g. of coke is measured by a mercury porosimetry process. Mercury is compressed into pores of the coke as the sample after evacuating under a reduced pressure of lower than 0.03 mmHg. and a volume of mercury impregnated from the reduced pressure of 0.1 kg./cm² to the pressure of 1000 kg./cm² is measured to calculate the pore volume.

Radius of pores measured by the equation of $$\gamma = 75000/p$$

wherein $\gamma$ represents a radius of pores (Å) and p represents a pressure (kg./cm²), in the 480 dyne/cm of a surface tension of mercury and 140° of a contact angle, is usually in a range of $7.5 \times 10^1$ to $7.5 \times 10^5$ Å.

In order to obtain the acicular coke having a pore volume of more than $40 \times 10^{-3}$ cc./g., various conditions such as a selection of the hydrocarbon source, an amount of the removed Q.I., a condition for coking and a temperature and a time for calcination, can be selected. In usual, the acicular coke having a pore volume of more than $40 \times 10^{-3}$ cc./g. for the present invention can be obtained by selecting the above-mentioned conditions.

In the relation of the pore volume and the quality of the carbon product, the carbon product having excellent thermal shock resistance can be obtained by using the acicular coke having a pore volume of more than $40 \times 10^{-3}$ cc./g. preferably more than $60 \times 10^{-3}$ cc./g. especially more than $80 \times 10^{-3}$ cc./g. The porosity is preferably less than $200 \times 10^{-3}$ cc./g. especially less than $150 \times 10^{-3}$ cc./g. When the acicular coke having a large pore volume such as more than $200 \times 10^{-3}$ cc./g. is used, the strength of the carbon product is disadvantageously low.

A preparation of an artificial graphite electrode as a typical process for preparing a carbon product by using the acicular coke having the specific pore volume will be illustrated in detail.

The acicular coke as an aggregate is pulverized and seived to separate it into grains having a maximum diameter of about 10 mm and powders having sizes of 200 mesh or less. The grain and the powder are blended at a ratio of about 60:40 to 40:60 to control the particle sizes. The coke having suitable particle sizes is blended to a binder such as a coal tar pitch at a ratio of about 70 to 76% of the coke to about 24 to 30% of the binder and the mixture was kneaded at about 140° to 160° C. The resulting kneaded mixture was cooled and molded by an extrusion molding at about 80° to 120° C. to obtain a molded product. The molded product is baked at a maximum temperature of about 750° to 1000° C. to obtain a baked product.

If it is necessary to improve characteristics of the baked product, a pitch is impregnated into the baked product at about 250° C. under a reduced pressure and the impregnated product is baked again as a second baking. The operations for the impregnation and the baking can be repeated if necessary.

The resulting baked product is graphitized in an electric furnace etc. at about 2600° to 3000° C. under feeding an electric current for about 2 to 4 days and annealing for longer than 10 days to obtain the object graphite electrode.

In accordance with the process of the present invention, the carbon product having excellent thermal shock resistance can be obtained by the simple process without any special complicated operation. This is especially advantageous.

In accordance with the present invention, the coal type source is coked and calcined to obtain the coal type acicular coke having a specific pore volume and the coke is used as the aggregate to obtain the carbon product having high strength and low thermal expansion coefficient and excellent thermal shock resistance as the baked, graphitized carbon product such as the artificial graphite electrode having high quality and high strength.

The present invention will be further illustrated by certain examples which are provided for purposes of illustration only.

EXAMPLE 1

A soft coal tar pitch having 6.8% by weight of a content of Q.I. was admixed with hydrocarbons as mixture of kerosene and naphthalene oil having about 250° C. of a distillation temperature for 95 vol. % and about 40 of B.M.C.I. value as the solvent. The mixture was heated and mixed and kept in stand-steel for sedimentation and a supernatant was separated and distilled to remove the solvent. A modified source having less than 0.1% by weight of a content of Q.I. was obtained. The operations were carried out by a batch system. The modified source was heated from the ambient temperature and maintained at about 480° C. under a pressure of about 2.5 kg./cm² for about 22 hours whereby it was coked to obtain an acicular green coke. The acicular green coke was charged into a crucible with a cap and heated at about 1300° C. for about 2 hours under flowing nitrogen gas to calcine it. The acicular coke was obtained. The acicular coke was pulverized, seived and reduced to separate it into various mesh particles. The coke having a particle size of 10 to 20 mesh (Japanese Industrial Standard) was sampled and a pore volume of the sample was measured by a cathetometer and a mercury compressing type porosimeter. As a result, the pore volume for pores having radius of from $7.5 \times 10^1$ to $7.5 \times 10^5$ Å was $49 \times 10^{-3}$ cc./g.

The cokes having different particle sizes were blended to give the distribution of the particle sizes as follows. 5 wt. % of 4 to 6 mesh; 20 wt. % of 6 to 10 mesh; 15 wt. % of 10 to 20 mesh; 10 wt. % of 20 to 36 mesh; 16 wt. % of 100 to 200 mesh; 16 wt. % of 200 to 325 mesh and 18 wt. % of less than 325 mesh.

Hundred wt. parts of the blended coke were admixed with 33 wt. parts of coal tar pitch (softening point of about 80° C.) as the binder and kneaded at about 145° C. for about 1 hour to obtain a mixture of coke and the binder. The mixture was cooled to about 115° C. and extruded for an extrusion molding at 115° C. at a nozzle ratio of 1/3.75 to obtain rods of the extruded products which had a diameter of about 2 cm and a length of about 12 cm.

The extruded products were charged with a packing powder in an electric furnace and baked by heating the furnace to about 1000° C. during about 72 hours, to obtain baked products. Then, the baked products were charged with the packing powder in a graphite crucible and graphitized in an industrial graphitization furnace by heating it to about 3000° C. to obtain graphite products.

In accordance with Japanese Industrial Standard R 7202, characteristics of the resulting graphite products (two samples) were measured. The mean values are shown in Table 1 in the column of Example 1.

EXAMPLE 2

In accordance with the process of Example 1 except using a soft coal tar pitch having 2.7% by weight of a content of Q.I. and operating in a continuous system, a modified source having less than 0.1% by weight of a content of Q.I. was produced.

The modified source was coked by a delayed coking process for about 24 hours under conditions of a temperature at an outlet of a furnace of 500° to 515° C.; a recycle ratio of about 0.3; and a pressure at a top of a coking drum of about 3.5 kg./cm$^2$G. to obtain an acicular green coke.

In accordance with the process of Example 1, the acicular green coke was calcined to obtain an acicular calcined coke and a pore volume of the acicular calcined coke was measured. The pore volume was $60 \times 10^{-3}$ cc./g/ coke.

In accordance with the process of Example 1 except admixing the acicular coke with 32 wt. parts of coal tar pitch as the binder and extruding the mixture at a nozzle ratio of 1/3 in an extrusion molding to obtain an extruded product having a diameter of about 2.5 cm and graphitizing the extruded product after baking at about 3000° C. for about 30 minutes in Tamman electric furnace, a graphite product was prepared. The characteristics of the baked product and the graphite product are shown in Table 2 in the column of Example 2.

EXAMPLE 3

In accordance with the process of Example 1 except charging the acicular green coke obtained in Example 2 in a crucible without a cap, it was calcined to obtain an acicular coke and a pore volume was measured. As a result, the pore volume was $85 \times 10^{-3}$ cc./g. coke.

In accordance with the process of Example 2 except using the resulting acicular coke and 34 wt. parts of coal tar pitch as the binder, a graphite product was prepared.

The characteristics of the products are shown in Table 2 in the column of Example 3.

EXAMPLE 4

In accordance with the process of Example 1 except adding kerosene having about 250° C. of a distillation temperature for 95 vol. % and about 19 of B.M.C.I. value as the solvent to the soft coal tar pitch and operating in a continuous system, a modified source having less than 0.1% by weight of a content of Q.I. was produced.

The modified source was coked by a delayed coking process for about 24 hours under conditions of a temperature at an outlet of a furnace of 485° to 505° C.; a recycle ratio of about 0.7 to 1.1; and a pressure at a top of a coking drum of about 3.5 kg./cm$^2$G. to obtain an acicular green coke.

In accordance with the process of Example 1, the acicular green coke was calcined at 1400° to 1460° C. in an industrial rotary kiln to obtain an acicular calcined coke and a pore volume of the acicular calcined coke was measured. The pore volume was $93 \times 10^{-3}$ cc./g. coke.

In accordance with the process of Example 2 except admixing the acicular coke with 35 wt. parts of coal tar pitch as the binder a graphite product prepared. The characteristics of the baked product and the graphite product are shown in Table 2 in the column of Example 4.

TABLE 1

| Pore volume of coke ($\times 10^{-3}$ cc./g.) | Example 1 49 |
|---|---|
| Characteristics of graphite product | |
| Bending strength (kg/cm$^2$) | 78 |
| Thermal expansion coefficient ($\times 10^{-7}$/°C.) | 7.0 |
| Electric specific resistance ($\times 10^{-4}$, Ω−cm) | 7.32 |
| Modulus of elasticity (kg/mm$^2$) | 706 |

TABLE 2

| Pore volume of coke ($\times 10^{-3}$ cc./g.) | Exp. 2 60 | | Exp. 3 85 | | Exp. 4 93 | |
|---|---|---|---|---|---|---|
| Kind of product | B.P. | G.P. | B.P. | G.P. | B.P. | G.P. |
| Characteristics of product | | | | | | |
| Bending strength (kg./cm$^2$) | 125 | 92 | 130 | 107 | — | 100 |
| Thermal expansion coefficient ($\times 10^{-7}$/°C.) | 13.4 | 6.9 | 13.1 | 6.6 | — | 7.2 |
| Electric specific resistance ($\times 10^{-4}$, Ω−cm) | 55.6 | 9.74 | 54.4 | 9.42 | 44.9 | 11.1 |
| Modulus of elasticity (kg./mm$^2$) | 1115 | 616 | 1204 | 658 | 1149 | 691 |

Note:
B.P.: Baked Product
G.P.: Graphite product

We claim:
1. A process for preparing a graphite product, which comprises:
  (a) mixing a hydrocarbon material derived from coal with a hydrocarbon solvent having a boiling point or a distillation temperature for 95 vol % of the solvent less than 350° C. and a B.M.C.I. value of 5 to 70, said value being defined as

$$\text{B.M.C.I.} = 48{,}640/k + 473.7S - 456.8$$

wherein k is the average boiling point (°K.) and S is the specific gravity at 60° F.;

(b) separating insoluble material which settles from the resulting mixture upon standing;

(c) removing by distillation at least a portion of said solvent from the insoluble matter free mixture;

(d) coking the residue obtained after distillation, thereby forming an acicular, green coke;

(e) calcining said acicular green coke, thereby obtaining an acicular calcined coke having a pore volume of more than $40 \times 10^{-3}$ cc/g; and (f) blending said acicular calcined coke with a binder, shaping the blend and graphitizing said blend at a high temperature.

2. The process of claim 1, wherein the pore volume of said acicular coke is within the range of 60 to $200 \times 10^{-3}$ cc/g of coke.

3. The process of claim 1, wherein said binder is coal tar pitch.

4. The method of claim 1, wherein said solvent is cyclohexane, kerosene or mixtures of kerosene and naphthalene oil combined in a ratio of 1:0.3 to 1:1 by weight.

5. The process of claim 1, wherein in step (f), prior to blending said coke with said binder said a acicular calcined coke is pulverized into a grain fraction having a maximum diameter of about 10 mm and a powder fraction having a mesh size of 200 or less and said grain fraction and said powder fraction are blended in a ratio of about 60:40 to 40:60.

6. The process of claim 5, wherein the coke material is blended with a binder in an amount of 70 to 76% coke to about 24 to 30% binder, and the resultant mixture is kneaded at a temperature of about 140° to 160° C.

7. The process of claim 6, wherein said shaped blend is graphitized at a temperature of about 2,600° to 3,000° C.

* * * * *